United States Patent [19]

Tsuchiya

[11] Patent Number: 5,290,097
[45] Date of Patent: Mar. 1, 1994

[54] TRACTION CONTROLLING APPARATUS FOR A MULTI-AXLE VEHICLE

[75] Inventor: Shigeki Tsuchiya, Saitama, Japan

[73] Assignee: Akebono Brake Industry Co., Ltd., Tokyo, Japan

[21] Appl. No.: 21,561

[22] Filed: Feb. 24, 1993

[30] Foreign Application Priority Data

Mar. 3, 1992 [JP] Japan ............................ 4-010396[U]

[51] Int. Cl.$^5$ ............................................. B60T 8/38
[52] U.S. Cl. ...................................... 303/113.2; 303/7; 303/118.1
[58] Field of Search ................. 303/118.1, 119.1, 111, 303/110, 100, 7-8, 113.2, 113.1; 188/3 R, 3 H, 181 R; 180/197

[56] References Cited

U.S. PATENT DOCUMENTS

| | | | |
|---|---|---|---|
| 4,819,995 | 4/1989 | Löhmann et al. | 303/113.2 |
| 4,973,108 | 11/1990 | Maki et al. | 303/118.1 |
| 5,211,449 | 5/1993 | Amtsfeld | 303/7 X |

FOREIGN PATENT DOCUMENTS

| | | |
|---|---|---|
| 0152627 | 8/1985 | European Pat. Off. |
| 0274610 | 7/1988 | European Pat. Off. |
| 63-305066 | 12/1988 | Japan |

*Primary Examiner*—Douglas C. Butler
*Attorney, Agent, or Firm*—Finnegan, Henderson, Farabow, Garrett & Dunner

[57] ABSTRACT

A traction controlling apparatus employable in a multi-axle vehicle wherein anti-lock braking and traction controlling can be achieved with a small number of channels. The traction controlling apparatus is constructed such that air pressure control type cut valves are disposed at intermediate positions in hydraulic lines such that wheel cylinders for driving wheels and wheel cylinders for follower wheels are hydraulically communicated with each other. The hydraulic lines can be opened or closed by actuating the air pressure control type cut valves, and air pressure delivered from the traction control valve is applied tot he air pressure control type cut valves so as to allow the hydraulic paths to be closed by the air pressure control type cut valves only when the vehicle is held in the traction controlling state.

5 Claims, 3 Drawing Sheets

TRACTION CONTROLLING APPARATUS FOR A MULTI-AXLE VEHICLE

BACKGROUND OF THE INVENTION

1. Field of the Invention

The present invention relates to a traction controlling apparatus for a multi-axle vehicle. More particularly, the present invention relates to a traction controlling apparatus for a multi-axle vehicle having air-over hydraulic type anti-lock brakes.

2. Discussion of the Related Art

Some large vehicles are designed with a single front axle and double rear axles to uniformly distribute a load acting on the vehicle. In recent years, there has been a tendency to install anti-lock brakes on such multi-axle vehicle to prevent the wheels from locking when braking. Additionally, to prevent the driving wheels from slipping when accelerating, a traction controlling apparatus is installed on the multi-axle vehicle.

Multi-axle vehicles having anti-lock brakes and a traction controlling apparatus, as shown in FIG. 4, have been known. This drawing shows a plurality of signal lines on the vehicle. Signal lines represented by fine hatched lines illustrate a pneumatic signal system; signal lines represented by bold hatched lines illustrate a pneumatic working system; and signal lines represented by non-hatched lines illustrate a hydraulic system. Although an air pressure supply source is not shown in the drawing, air pressure inputs are represented by arrow marks A.

The vehicle includes a brake valve 100 supplying an air pressure, corresponding to a quantity of brake actuation (not shown), to two relay valves 101 and 101a. Relay valve 101 outputs the air pressure to air master cylinders 104 associated with driving wheels M and follower wheels RR via two-way valves 103 and air control valves 102.

Relay valve 101a outputs the air pressure to an air master cylinder 104a corresponding to the front wheels F via an air control valve 102a.

The air master cylinders 104 and 104a transform the delivered air pressure into a hydraulic pressure that is transmitted to the corresponding wheel cylinders (WC) 15(L,R), 25(L,R), and 35(L,R) for braking.

Each two-way valve 103(L,R) compares the air pressure transmitted from the relay valve 101 with the air pressure transmitted from a traction control valve 300, and then selectively supplies the higher pressure of the two to the corresponding air master cylinder 104(L,R).

Front wheels F and driving wheels M are each equipped with a rotation sensor S. The air control valves 102(L,R), 102a and the rotation sensors S are electrically connected to an electronic central processing unit (ECU) 200. In response to a signal from the ECU 200, the air control valves 102 and 102a are opened or closed to prevent the corresponding wheel from being locked.

Specifically, when the rotation sensors S detect a reduction in the number of rotations of the wheel due to the wheel locking, the ECU 200 is informed of the reduction, and then ECU 200 controls the air pressure in each of the air master cylinders 104(L,R) and 104a via the air control valves 102(L,R) and 102a to check the corresponding wheel from locking.

A general structure of the air-over hydraulic type anti-lock brake has been described above. In addition to the foregoing equipment, the vehicle is additionally equipped with a traction controlling apparatus.

Specifically, the traction controlling apparatus is constructed such that when the ECU 200 detects that the driving wheels M are excessively rotating, the traction control valve 300 is opened, and an air pressure is supplied to the air master cylinders 104(L,R) via two-way valves 103(L,R) and air control valves 102(L,R) to brake the driving wheels M and follower wheels RR.

Only an axle 1 is a driven axle; an axle 2 is a follower axle. Due to this fact, the follower wheels RR tend to lock during traction controlling because both the driving wheels M and the follower wheels RR are simultaneously braked. The locking of follower wheels RR may lead to a further increase of slippage in the driving wheels M.

A traction controlling apparatus shown in FIG. 5 is a typical traction controlling apparatus wherein the follower wheels RR are not braked during traction controlling. Incidentally, the components in FIG. 5 that are the same as those shown in FIG. 4 are designated by the same reference numerals.

Specifically, the traction controlling apparatus shown in FIG. 5 is constructed such that only the driving wheels M are braked during traction controlling. As for braking, the follower wheels RR are braked by the air pressure supplied from the air master cylinder 104a common to the front wheels F.

With the traction controlling apparatus shown in FIG. 5, the increased slippage of driving wheels M, due to the locking of follower wheels RR, does not occur during traction controlling. But, during anti-lock brake controlling when only the front wheels are locked, the front wheels F and the follower wheels RR are controlled together, thus resulting in the follower wheels RR locking because of the variation of the weight borne by the rear axles induced by displacement of the gravity center of the vehicle at the time of quick braking on a road surface having a high friction coefficient such as a road paved with asphalt or the like.

To solve the problems inherent to the three-channel traction controlling apparatuses mentioned above, a traction-controlling apparatus shown in FIG. 6 has been known. This traction controlling apparatus has a pair of front wheels controlled by a common channel and each rear wheel controlled by an independent channel. With this construction, only the locking wheels are controlled by anti-lock braking, and, moreover, only the driving wheels experiencing slippage are controlled by traction controlling.

But, because the traction controlling apparatus shown in FIG. 6 has five channels, the number of components is increased compared with the three channel type traction controlling apparatus. Thus, the five-channel traction controlling apparatus costs more than the three-channel traction controlling apparatus to fabricate.

SUMMARY OF THE INVENTION

The present invention has been made in view of the above circumstances and has as an object to provide a traction controlling apparatus employable for a multi-axle vehicle which assures that anti-lock braking and traction controlling can be achieved with a small number of channels and only the driving wheels experiencing slippage during acceleration are controllably braked.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects in accordance with the purpose of the invention, as embodied and broadly described herein, the traction controlling apparatus of this invention for a multi-axle vehicle wherein the vehicle includes a front axle, a driving axle and a follower axle located adjacent to said driving axle, wheel cylinders for an opposing pair of driving wheels and wheel cylinders for an opposing pair of follower wheels are communicated with common air master cylinders, wherein the excessive rotating state of the driving wheels is detected during excessive rotating, an air pressure delivered from an air pressure supply source is applied to the air master cylinders via a traction control valve, and the air pressure is transformed into a hydraulic pressure in the air master cylinders so as to allow the hydraulic pressure to be applied to predetermined brakes in order to prevent the driving wheels held in the excessive running state from slipping, the traction controlling apparatus further including hydraulic lines by way of which the wheel cylinders for the driving wheels and the wheel cylinders for the follower wheels communicate with each other, air pressure control type cut valves disposed at intermediate positions on the hydraulic lines for opening or closing the hydraulic lines, wherein the air pressure transmitted from the traction control valve is also applied to the air pressure control type cut valves, and the hydraulic lines are closed by the air pressure control type cut valves only when the vehicle is in the traction controlling state.

A further object of the present invention is to brake only the driving wheels experiencing slippage during traction controlling, and to do so without any particular adverse effect on the anti-lock brakes.

Another object of the present invention is to reduce the number of components constituting the traction controlling apparatus, resulting in reduced fabrication cost of the traction controlling apparatus.

Another object of the present invention is to use a conventional electric control system employed for the conventional traction controlling apparatuses.

BRIEF DESCRIPTION OF THE DRAWINGS

The accompanying drawings, which are incorporated in and constitute a part of this specification, illustrate embodiments of the invention, and, together with the description, serve to explain the objects, advantages and principles of the invention. In the drawings.

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
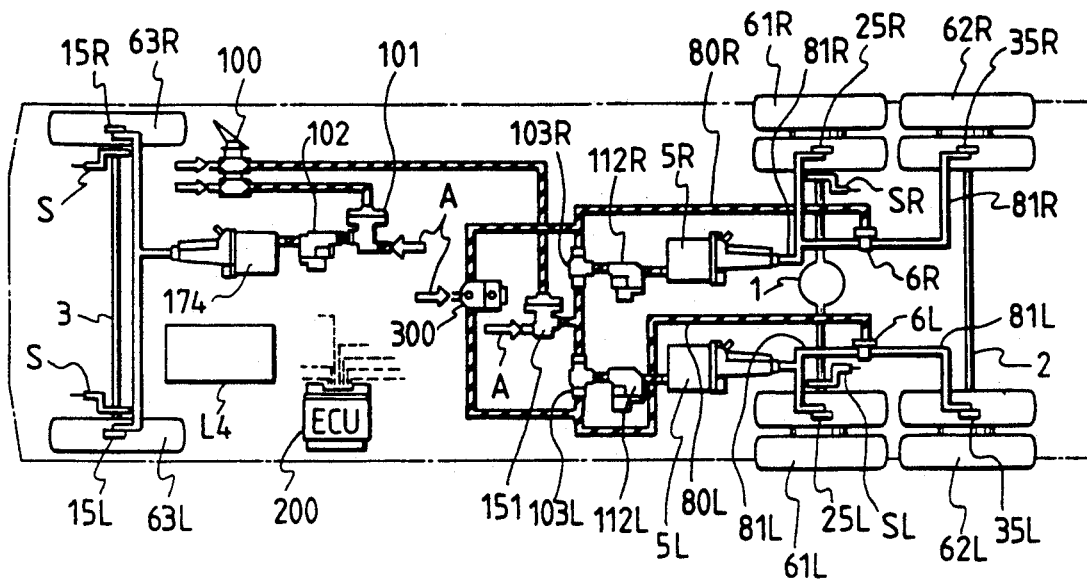
FIG. 1 is a plan view of a traction controlling apparatus in accordance with an embodiment of the present invention, particularly illustrating all of the signal lines in the traction controlling apparatus.

In accordance with the invention, the present invention includes a traction controlling apparatus employable for a multi-axle vehicle, as shown in FIG. 1, wherein the vehicle having two sides includes a front axle 3, a driving axle 1, a follower axle 2 located adjacent the driving axle 1, wheel cylinders 25(L,R) for an opposing pair of driving wheels 61(L,R) affixed to driving axle 1, wheel cylinders 35(L,R) for an opposing pair of follower wheels 62(L,R) affixed to follower axle 2, common air master cylinders 5(L.R) in communication with wheel cylinders 25(L,R) and wheel cylinders 35(L,R), sensors S(L,R) associated with wheel cylinders 25(L,R) for detecting the excessive rotating state of the driving wheels, an air pressure delivered from an air pressure supply source 4 and applied to the air master cylinders 5(L,R) via a traction control valve 300, and the air master cylinders 5(L,R) for transforming the air pressure into a hydraulic pressure to be applied to predetermined brakes in order to prevent the driving wheels 61(L,R) from slipping during acceleration.

The characterizing feature of the traction controlling apparatus constructed in the above-described manner is that the air pressure control type cut valves 6(L,R) are disposed at intermediate positions on hydraulic lines 81(L,R), so as to enable a section the hydraulic lines 81(L,R) leading to the wheel cylinders 35(L,R) to be opened or closed by the air pressure control type cut valves 6(L,R), and that the air pressure transmitted from the traction control valve 300 is applied to the air pressure control type cut valves 6(L,R) so that the sections of the hydraulic lines 81(L,R) leading to the wheel cylinders 35(L,R) are closed only when the vehicle is in the traction controlling state. With such construction, the vehicle requires only three channels for control, i.e., a single channel for the front wheels 63(L,R) and two channels for the driving wheels 61(L,R).

As for the mode of operation, first, while the vehicle is normally braked, the traction control valve 300 is not actuated, and, therefore, no air pressure is applied to the air pressure control type cut valves 6(L,R). Thus, the hydraulic lines 81(L,R) are open, and the hydraulic braking pressure is uniformly applied to all the wheel cylinders, whereby a vehicle can normally be decelerated.

Next, when the vehicle is in the anti-lock braking state, the air control valve 112(L,R) associated with the locking wheel is actuated. The air pressure controlled by the air control valve 112(L,R) is transformed into hydraulic pressure in the air master cylinders 5(L,R), and the hydraulic pressure controls the braking force applied to the wheel experiencing locking to suppress the locking. Because the traction control valve 300 is not actuated, no air pressure is applied to the air pressure control type cut valves 6(L,R), and, consequently, the hydraulic pressure to control wheel locking can be transmitted to the brakes for the follower wheels 62(L,R) experiencing locking to suppress the locking.

Next, when the driving wheels 61(L,R) excessively rotate on a slippery road surface, the traction control valve 300 is actuated. Consequently, air is supplied from the air pressure supply source 4 to the pneumatic system via traction control valve 300. The air pressure control type cut valves 6(L,R) in communication with the traction control valve 300 are actuated by the air pressure, whereby the hydraulic lines 81(L,R) for controlling the brakes for the follower wheels are closed. Thus, the traction controlling apparatus prevents braking of the follower wheels 62(L,R) during the traction control state.

As is apparent from the above description, the hydraulic lines 81(L,R) leading to the brakes disposed on the follower wheels 62(L,R) are closed by the air pressure control type cut valves 6(L,R) only when the vehicle is int he traction controlling state.

On the contrary, when the vehicle is not int he traction controlling state, i.e., when the vehicle normally runs, when the vehicle is normally braked, or when anti-lock braking is actuated, the hydraulic lines 81 are open whereby the follower wheels 62(L,R) can be braked without adverse affect to the anti-lock braking.

Figure 4:
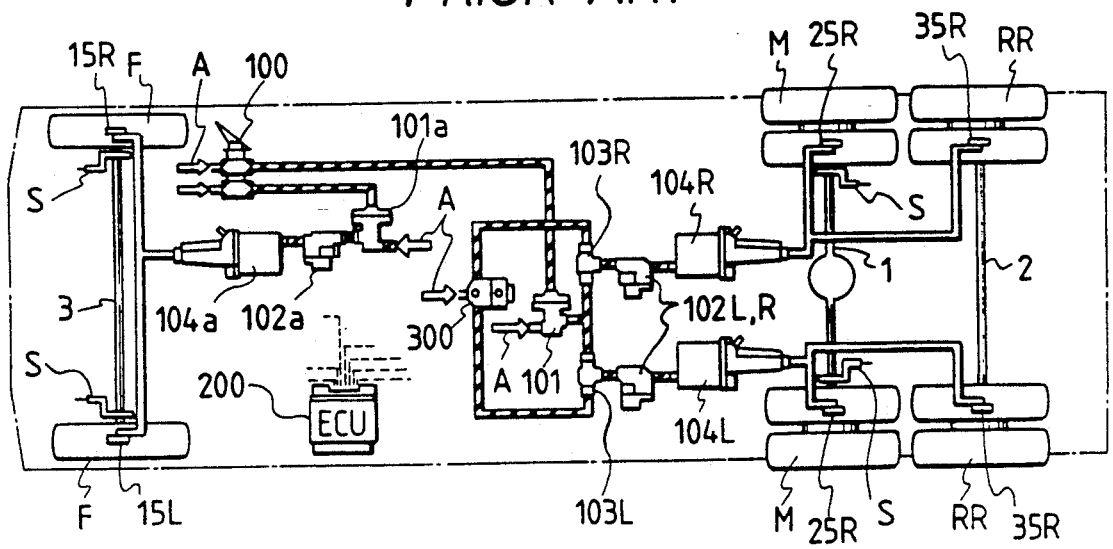
FIG. 4 is a plan view of a conventional traction controlling apparatus, particularly showing all of the signal lines in the traction controlling apparatus.
Figure 5:
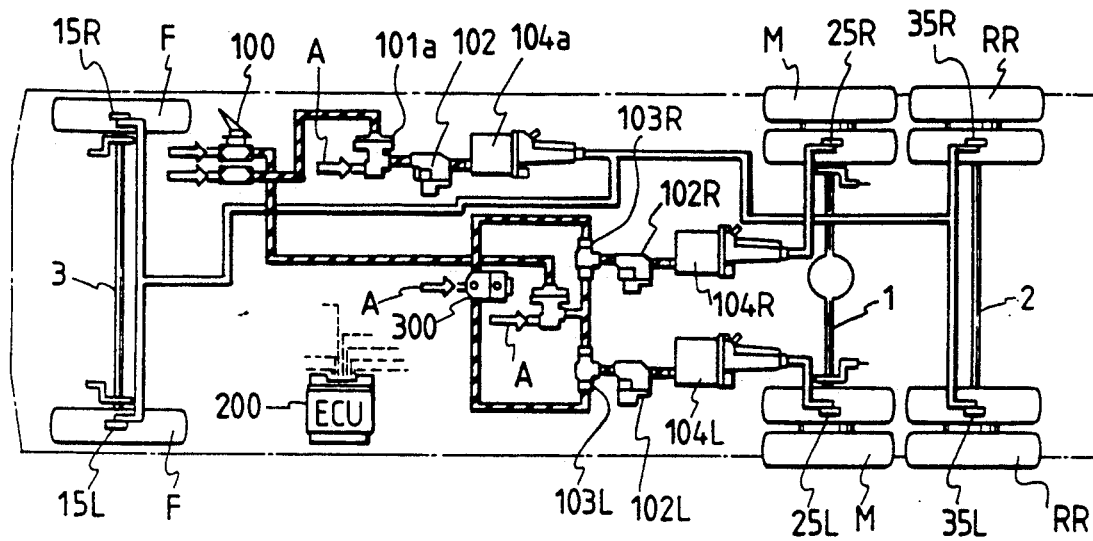
FIG. 5 is a plan view of another conventional traction controlling apparatus, particularly showing all of the signal lines in the traction controlling apparatus.
Figure 6:
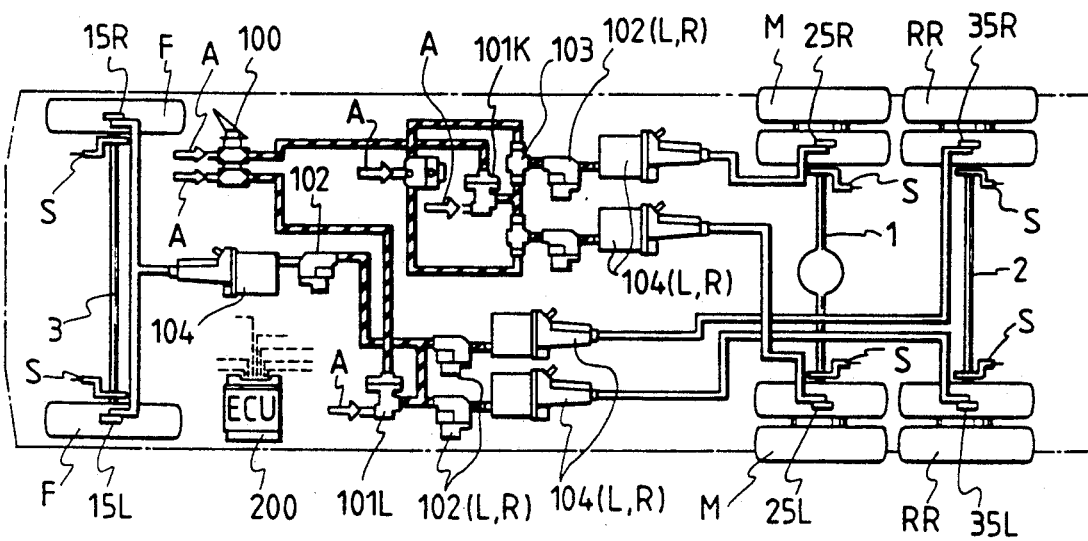
FIG. 6 is a plan view of one other conventional traction controlling apparatus, particularly showing the all of the signal lines in the traction controlling apparatus.

Because the traction controlling apparatus is similarly constructed to the conventional system shown in FIG. 4, with the traction control valve 300 delivering the air pressure to eliminate braking of the follower wheels during the traction controlling state, only three channels are required. In addition, there is not need to vary the electric control circuit for the traction controlling apparatus. Further, since the conventional electronic central processing unit and three channels can be used for the traction controlling apparatus, the present invention can be carried out inexpensively.

Figure 2:
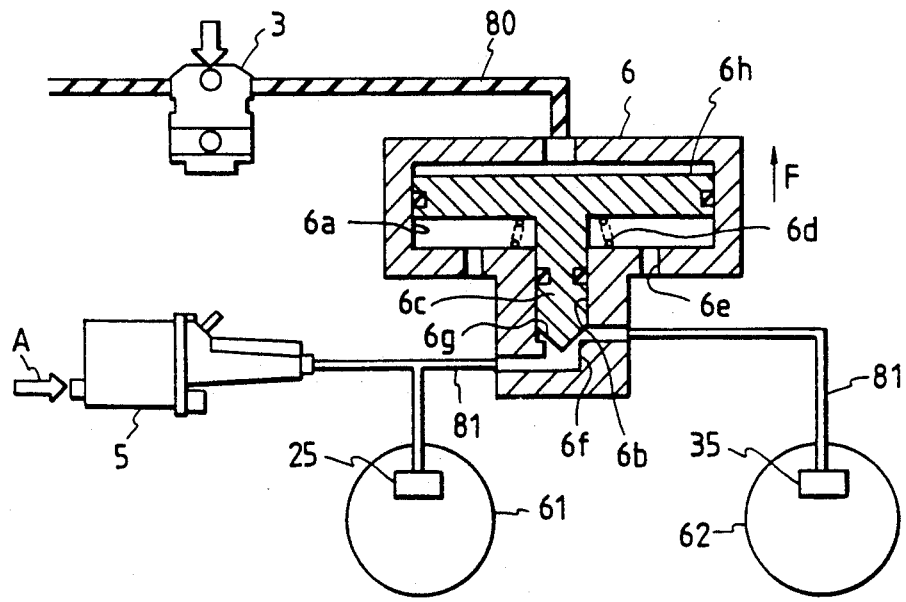
FIG. 2 is a detailed view of an air pressure control type cut valve shown in FIG. 1, particularly showing that a piston is lifted to open a hydraulic line.
Figure 3:
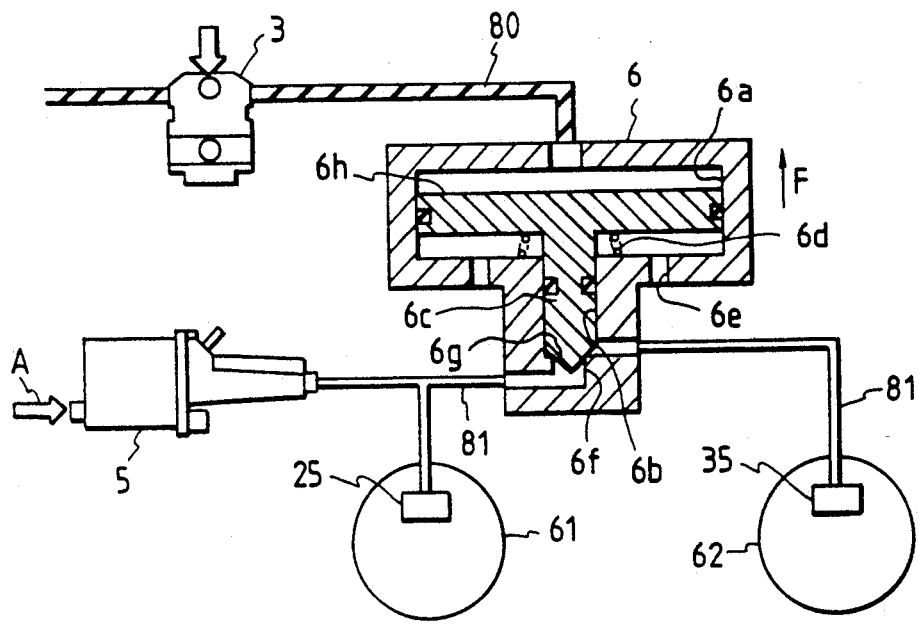
FIG. 3 is a detailed cross-section view of an air pressure control type cut valve shown in FIG. 1, particularly showing that a piston is seated to close the hydraulic line.

The present invention will be further clarified by the reference to FIG. 1 through FIG. 3, which illustrate a preferred embodiment. Incidentally, the components that are the same as the components of each of the conventional traction controlling apparatuses are designated by the same reference numerals. Moreover, descriptions of these components are not repeated.

This embodiment is applied to a three-axle kind of vehicle having two rear axles. The vehicle includes a front axle 3, a driving axle 1, a follower axle 2, driving wheels 62(L,R) mounted on the diving axle 1 located at a rear section of a vehicle body, follower wheels 62(L,R) mounted on the follower axle 2 and located behind the driving wheels 62(L,R), front wheels 63(L,R) mounted on the non-driving front axle 3 disposed at the fore section of the vehicle body.

Each of the foregoing wheels is controllably braked by an air-over hydraulic type anti-lock brake. An air pressure supply source is designated by reference numeral 4. The letter L of a reference numeral represents an unit or a component corresponding to the left-hand side of the vehicle, while reference character R represents an unit or a component corresponding to the right-hand side of the vehicle.

A brake valve 100 serves to control the air pressure delivered from the air pressure supply source 4 to air pressure inputs A and then supply the controlled air pressure to a relay valve 101 for the front wheels 63(L,R) and a relay valve 151 for the rear wheels 61(L,R) and 62(L,R).

The air pressure supplied from the relay valve 101 is applied to an air master cylinder 174 via an air control valve 102. The air master cylinder 174 serves to transform the air pressure into a hydraulic pressure which in turn is applied to the wheel cylinders 15(L,R) for the front wheels 63(L,R).

Moreover, the air pressure supplied from the relay valve 151 is applied to air master cylinders 5(L,R) via two-way valves 103(L,R) and air control valves 112(L,R). Similarly, each of the air master cylinders 5(L,R) serves to transform the air pressure into a hydraulic pressure which in turn is applied to the brakes correspond with wheel cylinders 25(L,R) and 35(L,R).

Rotation sensors S disposed on a vehicle body adjacent to the front wheels 63(L,R) and the driving wheels 61(L,R) are electrically connected to an electronic central processing unit (ECU) 200. In response to a signal from the ECU 200, the air control valves 102 and 112(L,R) are opened or closed so as to prevent the wheels from locking.

When there is a danger that the wheels are locking due to excessive braking, the number of rotations of the wheels monitored by the rotation sensors S is rapidly reduced, which is detected by the ECU 200, and, subsequently, the ECU 200 allows the air control valves 102 and 112(L,R) to properly control the air pressure in the corresponding air master cylinder in order to prevent the wheels from locking.

A traction control valve 300 is opened or closed in response to a command issued from the ECU 200 so as to enable the air master cylinders 5(L,R) to be actuated via the two-way valves 103(L,R) irrespective of the actuation of the relay valve 151. Air pressure control type cut valves 6(L,R) are disposed at intermediate positions on hydraulic lines 81(L,R) such that wheel cylinders 25(L,R) for the driving wheels and wheel cylinders 35(L,R) for the follower wheels are in communication with each other.

Each of the air pressure control type cut valves 6(L,R) is constructed as shown in FIG. 2. Specifically, an air cylinder 6a and a hydraulic cylinder 6b are formed in a casing of the air pressure control type cut valve 6, and a piston 6c is fitted liquid-tight, yet slidably accommodated, into the air cylinder 6a and the hydraulic cylinder 6b. The piston 6c is normally biased by the resilient force of a coil spring 6d in the arrow-marked direction F in such a manner as to reduce the working volume on the pneumatic side.

Venting holes 6e are formed through the bottom of the air cylinder 6a so as to attenuate the resistance caused by the displacement of the piston 6c. In addition, a hydraulic path 6f is formed through the bottom of the hydraulic cylinder 6b, and, when a valve portion at the lowermost end of the piston 6c engages a valve seat formed in the hydraulic path 6f, the latter is closed. While the hydraulic path 6f is closed, the hydraulic line 81 extending between the wheel cylinders 25 and 35 is closed.

When either one of the opposing pair of driving wheels 61 spins due to an excessive driving force, a speed difference arises between the front wheels 63 and the driving wheels 61, which is detected by the ECU 200. Consequently, the ECU 200 causes the traction control valve 300 and the air control valves 112(L,R) associated with the spinning wheel to be opened, whereby the air pressure is supplied to one of the air master cylinders 5(L,R). Concurrently, air pressure is supplied also to an input chamber 6h of the air pressure control type cut valve 6(L,R). This causes the piston 6c to be displaced by the air pressure in the opposite direction to the arrow-marked direction F so that the positional state shown in FIG. 2 is shifted to that shown in FIG. 3. Consequently, the hydraulic path 6f is closed with the valve portion of the piston 6c so that the hydraulic lines 81(L,R) are shut off. During this time, no hydraulic braking pressure is transmitted to the wheel cylinders 35(L,R) for the follower wheels, but the hydraulic braking pressure is transmitted to the wheel cylinders 25(L,R) for the driving wheels.

On the other hand, when the vehicle normally runs, when it is normally braked, or when anti-lock braking is actuated, no air pressure is present in the input chamber 6h of the air pressure control type cut valve 6. Thus, hydraulic lines 81 are open.

Incidentally, the number of channels to be controlled by ECU 200 is three, i.e., a single channel for the front wheels and two channels for two opposing pairs of rear wheels.

Next, a mode of operation of the traction controlling apparatus constructed in the aforementioned manner will be described below.

First, when the vehicle is normally braked, the traction control valve 300 is not actuated. Thus, no air pressure is applied to the air pressure control type cut valves 6(L,R), and, consequently, the hydraulic path 6f in each of the air pressure control type cut valves 6(L,R) is opened. Consequently, the hydraulic braking pressure is applied to both the wheel cylinders 25(L,R) and 35(L,R), causing the vehicle body to decelerate.

Next, when the anti-lock brakes are actuated, the air control valves 102 and 112(L,R) are opened or closed in response to a command issued from the ECU 200 based upon information regarding the number of rotations of the wheels detected by the rotation sensors S, whereby the air pressure in the air master cylinders 5(L,R) and 174 is properly controlled to achieve anti-lock control. The air pressure supplied to the air master cylinders 5(L,R) and 174 is converted into a hydraulic pressure, which in turn is delivered to the respective wheels as a hydraulic braking pressure. Because the traction control valve 300 is not actuated when the vehicle is in the anti-lock control state, no air pressure is applied to the air pressure control type cut valves 6(L,R), and, therefore, the hydraulic pressure can be transmitted to the wheel cylinders 35(L,R). Thus, the hydraulic pressure can be applied to the respective wheel cylinders 15(L,R), 25(L,R), and 35(L,R), whereby the locking of any wheel is correctly controlled.

Next, when that the driving wheels are excessively rotated on a slippery road surface, the traction control valve 300 is opened. This causes the air delivered from the air pressure supply source 4 to be supplied to the pneumatic lines 80(L,R) which are in communication with the traction control valve 300. Then, the air pressure control type cut valves 6(L,R) are actuated by the air pressure so that the hydraulic pressure to the wheel cylinders 35(L,R) is shut off. This prevents the follower wheels 62(L,R) from being braked during traction controlling.

Moreover, when slippage occurs in one of the opposing pair of driving wheels 61(L,R) during acceleration, the air control valve 112(L,R) on the pneumatic line associated with the driving wheel having no slippage is closed so that the driving wheel having no slippage is not braked.

As is apparent from the above description, the hydraulic lines leading to the brakes for the follower wheels are closed by the air pressure control type cut valves 6(L,R) only when the vehicle is in the traction controlling state. On the other hand, because the hydraulic paths are opened when the vehicle is not in the traction controlling state, i.e., when the vehicle normally runs, when the vehicle is normally braked, or when the anti-lock control is actuated, the traction controlling apparatus allows the follower wheels 62(L,R) to be braked. Thus, the anti-lock control is not adversely affected.

Because traction control valve 300 provides the air pressure for the traction control, controlling can be achieved with only three channels as is normally found in the conventional traction controlling apparatuses. Since the traction controlling apparatus only requires additional air pressure control type cut valves, there is no need to vary the electric control circuit, thus, a conventional ECU can be utilized. Consequently, the traction controlling apparatus can be fabricated inexpensively.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. A traction controlling apparatus for a multi-axle vehicle having two sides, a front section and a rear section, a front axle connected to the front section of the vehicle, a pair of front wheels connected with the front axle, a driving axle connected with the rear section of the vehicle, a pair of driving wheels connected with the rear axles, a follower axle connected with the rear section of the vehicle and located adjacent and behind the driving axle, a pair of follower wheels connected with the follower axle, a plurality of wheel cylinders, wherein one each of the plurality of wheel cylinders being in correspondence with each wheel and being connected with the axle associated with the corresponding wheel, a plurality of brakes, wherein one each of the plurality of brakes being in correspondence with each wheel cylinder, the traction controlling apparatus further comprising:

a first air master cylinder commonly connected with a first pair of hydraulic lines, wherein a first hydraulic line of the first pair supplies a hydraulic braking pressure to the wheel cylinder corresponding to the driving wheel on one side of the vehicle and a second hydraulic line of the first pair for supplying a hydraulic braking pressure to the wheel cylinder corresponding with the follower wheel on the one side of the vehicle;

a second air master cylinder commonly connected with a second pair of hydraulic lines, wherein a first hydraulic line of the second pair supplies a hydraulic braking pressure to the wheel cylinder of the driving wheel on the other side opposite the one side of the vehicle and a second hydraulic line of the second pair supplies a hydraulic braking pressure to the wheel cylinder of the follower wheel on the other side of the vehicle;

a traction control valve connected with an air pressure supply source for jointly supplying an air pressure to each of the air master cylinders, wherein each air master cylinder transforms the supplied air pressure into the hydraulic braking pressure of the first pair and second pair of hydraulic lines;

a pair of air pressure control type cut valves, one each being disposed in each of the second hydraulic lines, for opening and closing the second hydraulic lines; and a third pair of hydraulic lines, one each of the third pair of hydraulic lines connecting the traction control valve to one each of the air pressure control type cut valves, wherein the air pressure supplied to the pair of air master cylinders is jointly supplied to the air pressure control type cut valves.

2. A traction controlling apparatus as recited in claim 1, including a plurality of sensors, wherein one each of the plurality of sensors is positioned in correspondence with one each of the driving wheels, for detecting a rotational speed of the corresponding driving wheel, wherein the traction control valve is opened when the detected rotational speed of one of the driving wheels is excessive, and wherein the air pressure is supplied to the pair of air master cylinders and the pair of air pressure control type cut valves when the air traction control valve is open.

3. A traction controlling apparatus as recited in claim 1, wherein either one of the pair of air pressure control type cut valves is closed when the air pressure is supplied.

4. A traction controlling apparatus as recited in claim 1, wherein either one of the pair of air pressure control type cut valves is opened when no air pressure is supplied.

5. A traction controlling apparatus as recited in claim 1, further including a pair of air control valves, one each of the air control valves being disposed in one each of the first hydraulic lines of the first and second pair of hydraulic lines for relieving the air pressure to the pair of air master cylinders.

* * * * *